(12) United States Patent
Rodriguez et al.

(10) Patent No.: US 6,651,173 B1
(45) Date of Patent: Nov. 18, 2003

(54) CALENDAR-INDUCED DESKTOP SECURITY

(75) Inventors: Herman Rodriguez, Austin, TX (US); Newton James Smith, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/343,629

(22) Filed: Jun. 30, 1999

(51) Int. Cl.[7] ................................................. G06F 1/24
(52) U.S. Cl. ........................ 713/200; 713/183; 713/176
(58) Field of Search ................ 713/183, 176, 713/502, 200

(56) References Cited

U.S. PATENT DOCUMENTS 5,564,016 A * 10/1996 Korenshtein ................ 713/200
5,594,430 A * 1/1997 Cutter et al. ................ 340/5.22

* cited by examiner

Primary Examiner—Thomas R. Peeso
(74) Attorney, Agent, or Firm—David A. Mims, Jr.; Bracewell & Patterson, L.L.P.

(57) ABSTRACT

For events scheduled within a user's calendar, a security mode is associated with the event. At the start of the scheduled event, the calendar notifies the security module of the security mode and the security mode is initiated. Different security modes may be defined, such as locking the system indefinitely, until the user unlocks the system with the password, locking the system for the duration of the event, or setting a shorter or longer inactivity period for a timer activated lock. Different event types may thus be matched with appropriate security modes, providing better overall security. The security mode, once initiated, may be maintained until the end of the schedule event, at which time the system may revert to a default security mode. Alternatively, the security mode may, by user specification or by default, be maintained until a different security mode is requested by the user, utilizing a password. The security system thus takes into consideration a user's behavior and scheduled activities in activating a system lock or other security mode.

30 Claims, 4 Drawing Sheets

CALENDAR-INDUCED DESKTOP SECURITY

RELATED APPLICATIONS

The present invention is related to the subject matter of the following commonly assigned, U.S. patent applications: Ser. No. 09/343,628 entitled "CALENDAR-INDUCED PROGRAM EXECUTION" and filed Jun. 30, 1999; and Ser. No. 09/343,626 entitled "CALENDAR BASED POWER MANAGEMENT" and filed Jun. 30, 1999. The content of the above-referenced applications is incorporated herein by reference.

BACKGROUND OF THE INVENTION

1. Technical Field

The present invention generally relates to security for data processing systems and in particular to security systems providing keyed locking for system operation. Still more particularly, the present invention relates to a data processing security system which takes into account a user's schedule of activities when activating a locking mechanism.

2. Description of the Related Art

Security mechanisms for personal computers, whether desktop or mobile, generally provide security through a password locking mechanism, which is typically activated either by explicit invocation from the user or by an inactivity timer. The password locking mechanism is activated early in the startup process to prevent user from operating a system without the password. Some systems must remain continually powered, however, to serve data requests from a network and for similar reasons.

The problem with requiring explicit invocation of a locking mechanism is a running system is that the user may forget to invoke the locking mechanism before leaving for an extended period of time, compromising the security of the system. On the other hand, locking a system after detecting a period of inactivity may prove a nuisance to the user, who may be working but simply not have need to use the system before the timeout period expires. Having to unlock the system repeatedly to continue working may frustrate the user into disabling the inactivity timer.

Current locking technology also fails to take into consideration the user's behavior. In particular, if the user is absent for extended periods of time and the system is not locked as a result of inactivity, the system remains unlocked, exposing the confidentiality of the system and its data, and potentially endangering the integrity of the system through unauthorized use.

It would be desirable, therefore, to provide a security system which accounts for a user's behavior and scheduled activities in activating a system lock.

SUMMARY OF THE INVENTION

It is therefore one object of the present invention to provide improved security for data processing systems.

It is another object of the present invention to improve data processing system security systems having keyed locking for system operation.

It is yet another object of the present invention to provide a data processing security system which takes into account a user's schedule of activities when activating a locking mechanism.

The foregoing objects are achieved as is now described. For events scheduled within a user's calendar, a security mode is associated with the event. At the start of the scheduled event, the calendar notifies the security module of the security mode and the security mode is initiated. Different security modes may be defined, such as locking the system indefinitely, until the user unlocks the system with the password, locking the system for the duration of the event, or setting a shorter or longer inactivity period for a timer activated lock. Different event types may thus be matched with appropriate security modes, providing better overall security. The security mode, once initiated, may be maintained until the end of the schedule event, at which time the system may revert to a default security mode. Alternatively, the security mode may, by user specification or by default, be maintained until a different security mode is requested by the user, utilizing a password. The security system thus takes into consideration a user's behavior and scheduled activities in activating a system lock or other security mode.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DESCRIPTION OF THE PREFERRED EMBODIMENT

Figure 1:
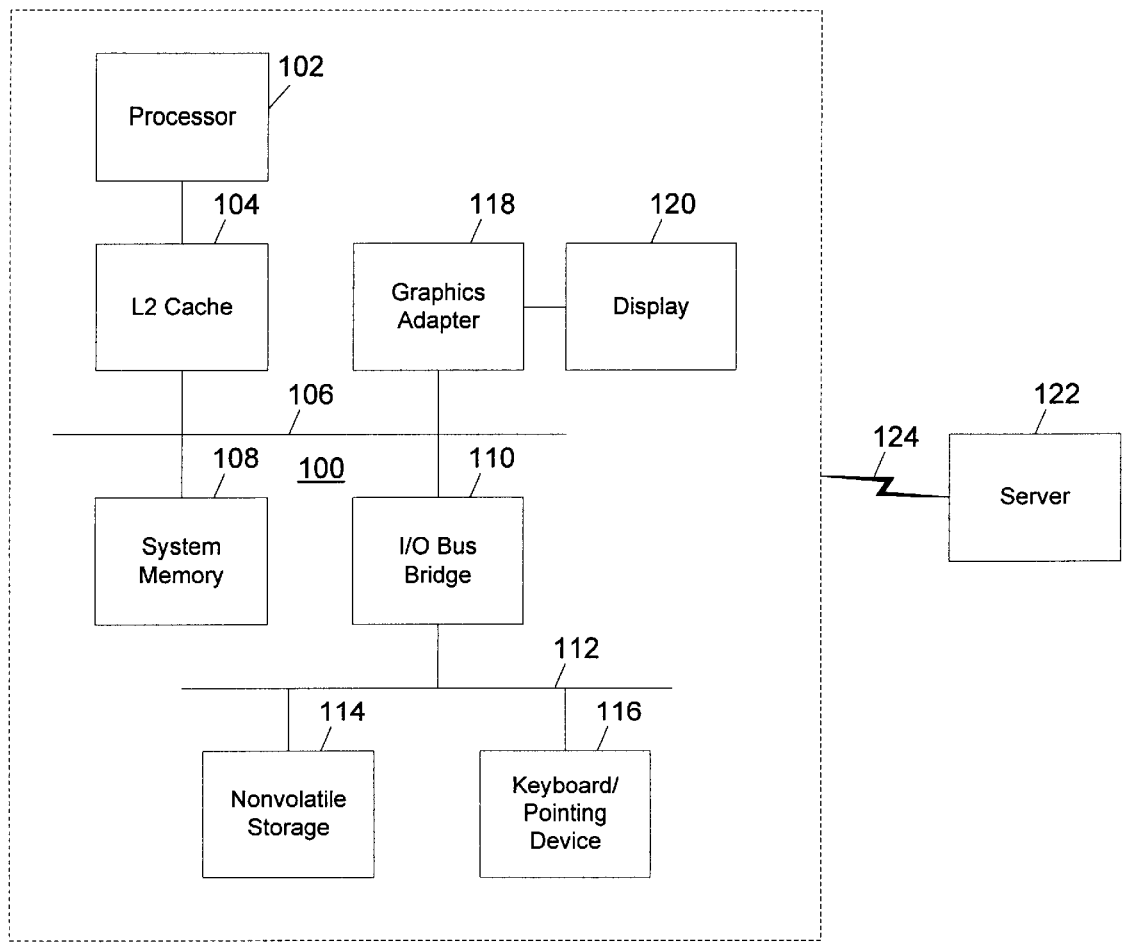
FIG. 1 depicts a block diagram of a data processing system in which a preferred embodiment of the present invention may be implemented.

With reference now to the figures, and in particular with reference to FIG. 1, a block diagram of a data processing system in which a preferred embodiment of the present invention may be implemented is depicted. Data processing system 100 includes a processor 102, which is connected in the exemplary embodiment to a level two (L2) cache 104, connected in turn to a system bus 106.

Also connected to system bus 106 is system memory 108 and input/output (I/O) bus bridge 110. I/O bus bridge 110 couples I/O bus 112 to system bus 106, relaying and/or transforming data transactions from one bus to the other. Peripheral devices such as nonvolatile storage 114, which may be a hard disk drive, compact disk read-only memory (CD-ROM) drive, or digital video disk (DVD) drive, and keyboard/pointing device 116, which may include a conventional mouse, a trackball, or the like, are connected to I/O bus 112. Data processing system 100 further includes graphics adapter 116 connected to system bus 106, receiving primitives for rendering from processor 102 and generating pixels for display 120.

The operation of data processing system 100 is well known to those skilled in the art. A basic input/output system (BIOS), power-on self-test (POST), and various startup routines initialize the hardware and permit interaction between hardware components. An operating system, such as a version of the Windows operating system available from Microsoft Corporation of Redmond, Wash., provides a platform for execution of applications and for basic user interaction, such as display of information or manipulation of a cursor within the display by a pointing device. Operating system device drivers allow software components to interact with and control hardware components. Data processing system may be connected to a server 122 via a communications link 124 in accordance with known networking techniques.

In the present invention, either the operating system includes a calendar utility or a calendar application runs on top of the operating system. Additionally, the operating system preferably includes a security module. Alternatively, a security application runs on top of the operating system and provides the capability to prevent a user from operating the system unless a password or other key is employed.

Figure 2:
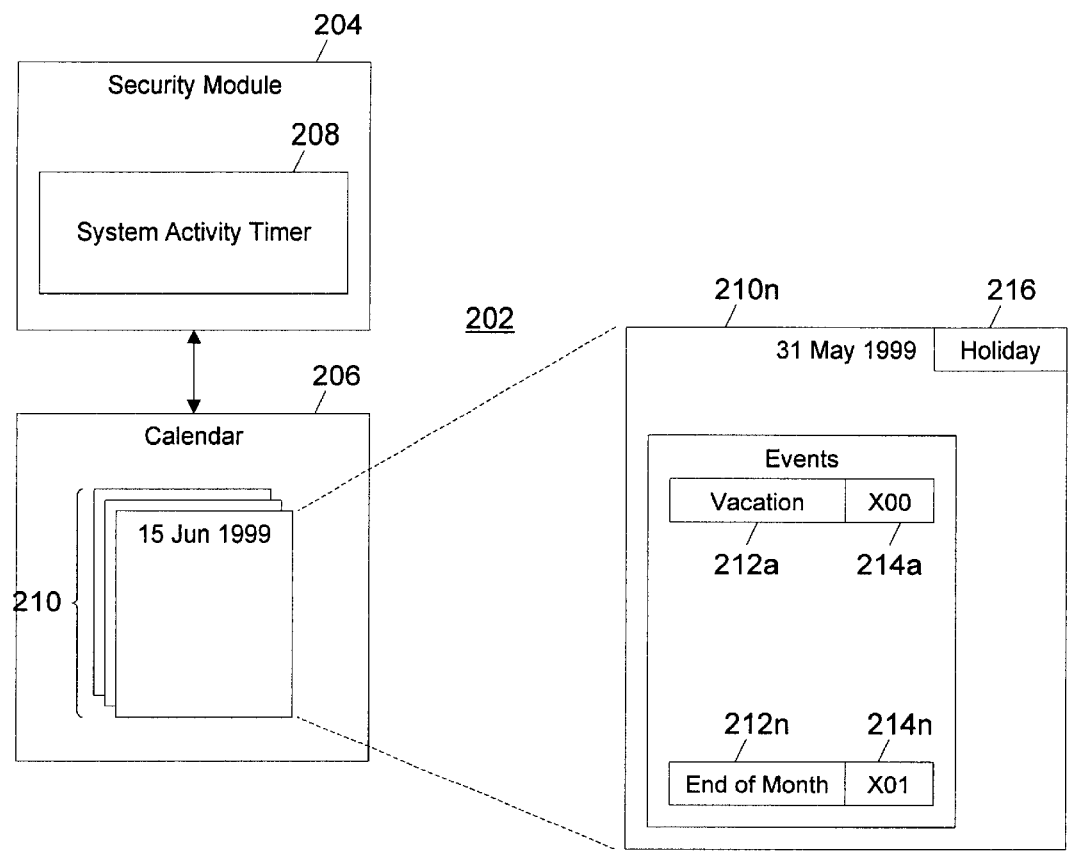
FIG. 2 is a diagram of a calendar-induced security system in accordance with a preferred embodiment of the present invention.

Referring to FIG. 2, a diagram of a calendar-induced security system in accordance with a preferred embodiment of the present invention is illustrated. Calendar-induced security system 202 includes a security module 204 and a calendar 206. Security module 204 provides a locking mechanism preventing a system from being utilized unless a password or other key is employed to disable the lock. Security module 204 may include a system activity timer 208 for timing periods of inactivity in accordance with the known art. However, security module 204 also provides a locking mechanism which is augmented by incorporating the user's behavior represented in the user's calendar of activities 206.

Calendar 206 contains a plurality of data objects or records 210 for each date within a range of dates, such as all dates within a given year and/or each date for which some event is created. The user may create entries 212a–212n within any given date 210n, which entries 212a–212n specify events or activities within the user's schedule. Such events or activities may include "Vacation," "Trip," "Meeting," "Out-of-Office Meeting," etc. The events or activities specified by an event entry 212a–212n may be one of a number of predefined events or activities, or may be a user-defined event or activity.

Event entries 212a–212n contain a description of the user's activities, including the location of meetings, events, and personal and company holidays. Event entries 212a–212n need not be created by the user, but may be (locally or remotely) created by a network administrator for company holidays, sick days taken by the user, and the like.

During creation of an event entry 212a–212n, the user is prompted (as a menu option, for example) to specify a security mode 214a–214n in which the system should be placed for the duration of the event, together with a timer for initiating system locking, if applicable, before or after the start of the event. The security mode 214a–214n may specify locking the system, either completely or with a user override, or setting a timed lock with a specified timeout period of inactivity. Thus, for instance, the system inactivity timeout period for a particular event—say, a business meeting with a supplier—may be set much shorter than the user would employ for normal working conditions (e.g., five minutes versus thirty minutes). The security provided for the event is thus much more appropriate and leaves less likelihood of unauthorized access to data on the system.

Thus, for example, for a vacation entry, a user may specify that the system should be locked, since leaving the machine operating and unlocked would pose a substantial security risk. If the user has not already locked the system prior to going on vacation, the security module 204 will lock the system for the user. Particular dates 210n, such as holidays, may also have an associated security mode 218, initiated for the duration of those dates.

The security mode 214a–214n may be predefined for certain event or activity types, such as "Vacation" or "Meeting." Such predefined security modes 214a–214n may simply be a default for that event type, and the user may be provided the option of overriding or altering the predefined security mode 214a–214n. If the security mode 214a–214n is not predefined for a particular event type, or if an event entry 212a–212n is created which is not a predefined event type, the user is prompted to set the security mode 214a–214n in which the system should be placed for the duration of the event.

As the start time is reached for calendared events 212a–212n, the security mode 214a–214n associated with the event is sent by calendar 206 to security module 204, which initiates the specified security mode. For concurrent events, the highest security mode associated with any event is employed by the security module 204. Therefore, if the user is absent from the environs of the system and unable to utilize the system, the system may be automatically locked, and remain locked for the absence period. Upon the user's anticipated return, as reflected by the calendar entry or entries 212a–212n, the system may be automatically unlocked. Even if the system is automatically unlocked, other locking mechanisms remain in effect such that if the user is late in returning from an event, the system relocks based on inactivity.

Prior to the start time of an event, the user can be notified via a pop-up dialog, which can be set to activate a predetermined period prior to the start time of the event. If the user acknowledges the pop-up, the desktop locking mechanism is induced to lock the system at the start time of the event. If the user does not acknowledge the pop-up, the system recognizes the user as overriding the scheduled event and the system locking mechanisms remain as previously configured.

Alternatively, user acknowledgement of the pop-up may be recognized as confirmation of the scheduled event, and the security mode associated with the scheduled event is invoked at the start of the event. As yet another alternative, the security module 204 may simply invoke the security mode associated with scheduled events as the start time is reached without prior warning to the user, allowing the user to manually override any lock which is applied.

The system security mode initiated at the start of a scheduled event may lapse at the end of the event, or continue until the user again actively utilizes the system. If the security mode associated with an event is allowed to lapse at the end of the event and the user does not utilize the system for several consecutive events, the calendar 206 need not present acknowledgement pop-ups and may keep the system locked until the system is unlocked by the user.

The present invention may also be utilized as a second level security mechanism. The system is most susceptible to unauthorized use when the user is absent. If an intruder manages to acquire the user's password, the best time for the intruder to take advantage of the acquired password and engage in unauthorized use of the system is when the user is absent. However, security module 204 may lock the system during events within calendar 206 for which the user is absent. Any attempt to override the system lock induced by the calendar event may require a second password, providing an extra level of security for the system. The present invention may thus also be employed for highly sensitive systems, limiting even an authorized user to access only during specified periods during which the user is permitted access to the system (e.g., between 9:00 a.m. and 5:00 p.m. on weekdays). In this case, when an attempt to access the system occurs when the user's schedule indicates that he is absent, a notification of the attempted intrusion into the system may be sent to the user (e.g., e-mail to a personal digital assistant or text-based pager).

In addition, as part of the invention, the user's background desktop image and motif can change automatically based on the type of event specified in the calendar 206. Thus, for example, if the user is attending a remote conference, the desktop theme, background images, and motifs can inform passersby of the whereabouts of the system's owner.

Figure 3A:
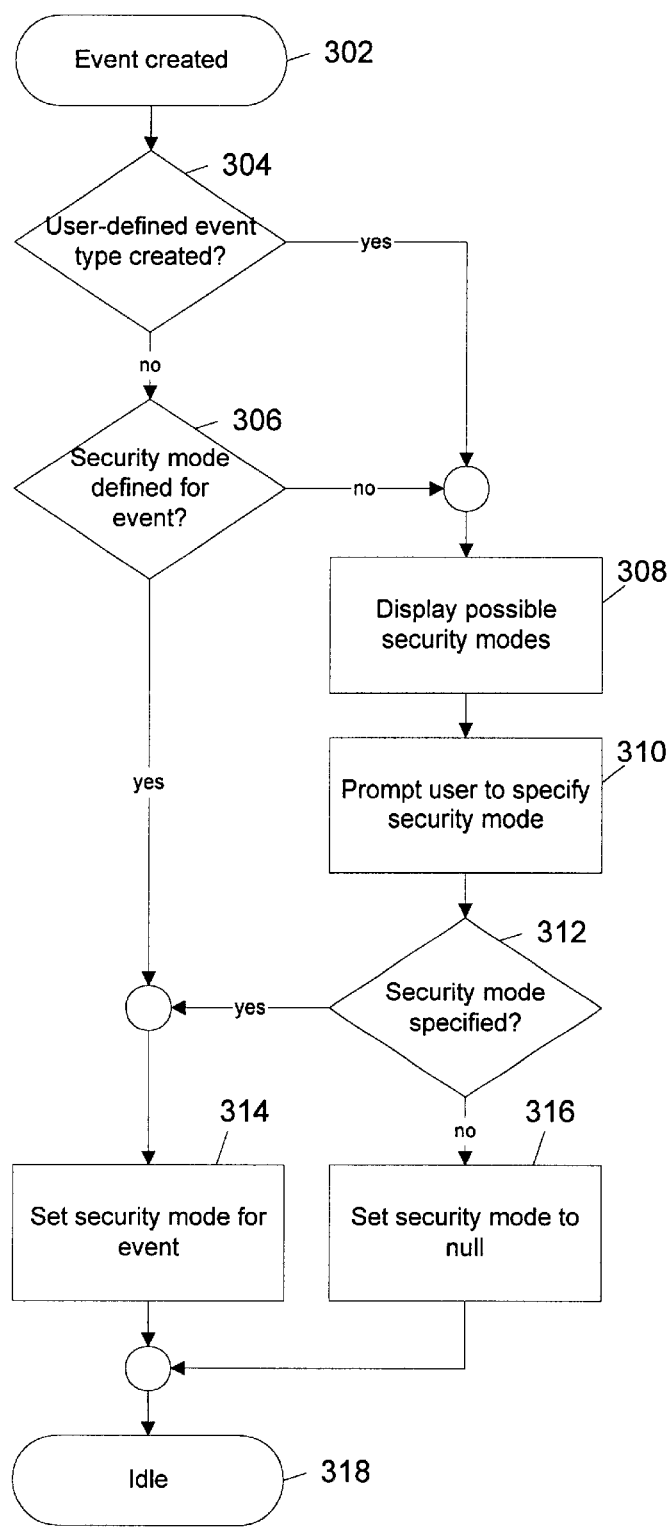
FIGS. 3A–3B depict high level flow charts for processes of establishing and employing calendar-induced system security in accordance with a preferred embodiment of the present invention.
Figure 3B:
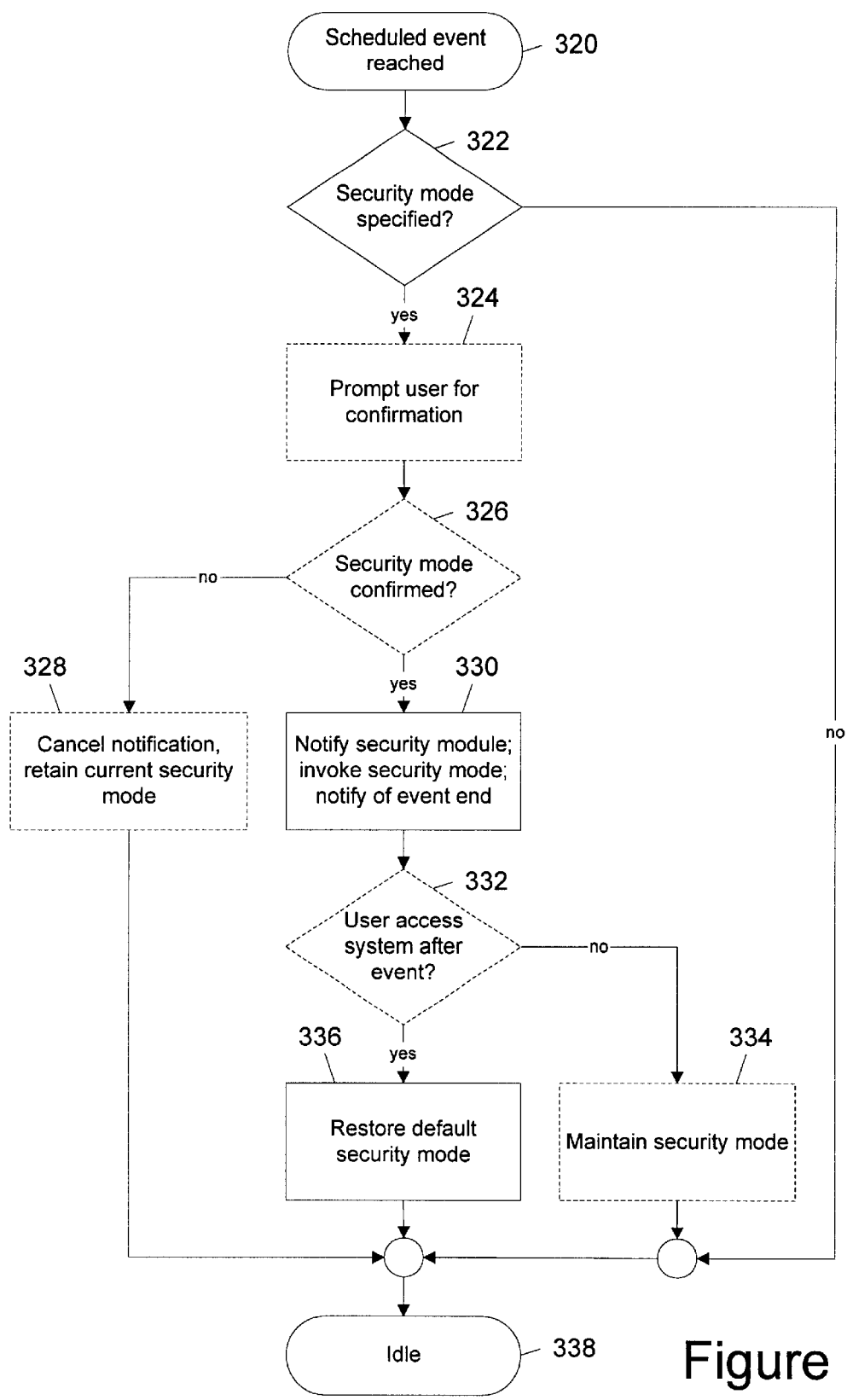

With reference now to FIGS. 3A and 3B, high level flow charts for processes of establishing and employing calendar-induced system security in accordance with a preferred embodiment of the present invention are depicted. The process of establishing calendar-induced system security, depicted in FIG. 3A, begins with step 302, which depicts an event or activity entry being created within a user's calendar.

The process then passes to step 304, which depicts a determination of whether a new user-defined event entry type (i.e., not predefined or previously user-defined) was created. If not, the process proceeds to step 306, which illustrates a determination of whether a security mode is specified for the event entry type created. Predefined event entry types (e.g., "Vacation") may have associated default security modes (typically "locked" for the example of "Vacation") within their definition. Alternatively, the user may have previously defined the event entry type selected (e.g., "Mom's house") for the event or activity entry created, and specified a security mode to be associated with event entries of that type. Since different security modes are possible, the user may also employ different passwords (e.g., short versus long) depending on whether the user is scheduled to be using the system or scheduled to be altogether away from the system.

If a new user-defined event type is created (step 304), or if no security mode is specified for the entry type of the entry just created (step 306), the process proceeds instead to step 308, which illustrates displaying a list of possible security modes for a user, and then to step 310, which depicts prompting the user to specify a security mode for the event entry just created. The process then passes to step 312, which illustrates a determination of whether a security mode has been specified for the event entry just created within the user's calendar.

If a security mode is defined for an event type of the newly-created event entry (step 306), or if the user specifies a security mode to associate with the event entry (step 312), the process proceeds to step 314, which depicts setting the security mode as specified or defined for the just-created event entry. Otherwise, the process proceeds instead to step 316, which illustrates setting the security mode associated with the event entry to a null value.

From either of steps 314 or 316, the process next passes to step 318, which depicts the process becoming idle until another event or activity entry is created in the user calendar. The calendar, however, should be preconfigured to send a notification of the security mode associated with an event to the security module when the beginning date and time for an event having a non-null associated security mode is reached.

The process of employing calendar-induced system security, depicted in FIG. 3B, begins at step 320, which illustrates the start date and time for a scheduled event being reached, or a predetermined point before the scheduled start date and time being reached. The process then passes to step 322, which depicts a determination of whether a security mode is associated with the scheduled event. If so, the process proceeds to optional step 324, which illustrates prompting the user for confirmation of the scheduled event.

If step 324 is implemented, the process passes to optional step 326, which depicts a determination of whether the scheduled event was confirmed by the user. If not, the process proceeds to optional step 328, which illustrates cancelling the notification to the security module of the security mode associated with the scheduled event and remaining in a current security mode.

If optional steps 324, 326, and 328 are not implemented, or if the scheduled event is confirmed by the user, the process proceeds instead to step 330, which depicts the calendar notifying the security module of the security mode associated with the scheduled event, and the security module initiating the specified security mode. The calendar may also notify the security module of the end of the scheduled event with which the security mode was associated.

The process then passes to optional step 332, which illustrates a determination of whether the user has accessed the system since the start of the scheduled event. This step may be implemented if the security mode associated with the scheduled event is to be maintained until the user accesses the system to override the security mode. If step 332 is implemented and the user has not accessed the system since the scheduled event's start time, the process proceeds to step 334, which depicts maintaining the security mode initiated at the start of the scheduled event, until the user accesses the system.

Steps 332 and 334 need not be implemented if the system is to revert to a default security mode at the end of a scheduled event for which the security mode was initiated. If steps 332 and 334 are not implemented, or if the user attempts to access the system subsequent to the initiation a security mode associated with the scheduled event, the process proceeds instead to step 336, which depicts reverting to a default security mode for the system, which may be either higher or lower than the security mode associated with the scheduled event. The process then passes to step 338, which illustrates the process becoming idle until the start time for another scheduled event is reached.

As noted above, if concurrent or overlapping events occur, the highest security mode associated with any scheduled event is initiated and maintained until no longer called for (e.g., the end of the scheduled event having the highest security mode). The system then transitions to the next highest security mode for any ongoing scheduled event, etc. For certain event types, such as travel events during which the system may be lost or stolen, the associated security mode may be maintained indefinitely, until overridden by the user. For other event types, the security mode may be employed for only as long as the scheduled event. The present invention thus provides greater flexibility in setting security for a system, taking into consideration the user's schedule of activities to improve overall security.

It is important to note that while the present invention has been described in the context of a fully functional data processing system and/or network, those skilled in the art will appreciate that the mechanism of the present invention is capable of being distributed in the form of a computer usable medium of instructions in a variety of forms, and that the present invention applies equally regardless of the particular type of signal bearing medium used to actually carry out the distribution. Examples of computer usable mediums include: nonvolatile, hard-coded type mediums such as read only memories (ROMs) or erasable, electrically programmable read only memories (EEPROMs), recordable type mediums such as floppy disks, hard disk drives and CD-ROMs, and transmission type mediums such as digital and analog communication links.

While the invention has been particularly shown and described with reference to a preferred embodiment, it will be understood by those skilled in the art that various changes in form and detail may be made therein without departing from the spirit and scope of the invention.

What is claimed is:

1. A method of calendar-induced security of data processing systems, said method comprising:

creating a calendar entry within a user calendar on a data processing system; and associating a security parameter with the calendar entry, wherein the associated security parameter specifies a security mode associated with operation of the data processing system to be initiated upon reaching a start time for the calendar entry.

2. The method of claim 1, wherein the step of associating a security parameter with the calendar entry further comprises:

prompting the user to specify the security mode, wherein said security mode is selected from among a group of available security modes comprising system lock, restricted access, and status message display.

3. The method of claim 1, wherein the step of associating a security parameter with the calendar entry further comprises:

selecting a security mode previously assigned to an event type for the calendar entry.

4. The method of claim 1, further comprising:

initiating the security mode at a start of the calendar event.

5. A method of calendar-induced security of a data processing system, comprising:

determining whether a start time for a calendar entry within a user calendar has been reached;

responsive to determining that the start time has been reached, determining whether a security parameter is associated with the calendar entry; and responsive to identifying a security parameter associated with the calendar entry, initiating a security mode associated with operation of said data processing system specified within the security parameter.

6. The method of claim 5, wherein the step of initiating a security mode specified within the security parameter further comprises:

dynamically locking a system containing the user calendar, wherein said locking includes preventing access and restricting access to said user calendar to only a user entering a required override password; and removing the lock on said system when said override password is entered and when said calendar event is finished.

7. The method of claim 6, wherein the step of dynamically locking a system containing the user calendar further comprises:

locking the system until an authorized user requests a different security mode, wherein access to said system is restricted to said authorized user having the override password.

8. The method of claim 6, wherein the step of locking a system containing the user calendar further comprises:

locking the system for a duration of the calendar event; and subsequently unlocking the system when the calendar event completes.

9. The method of claim 5, wherein the step of initiating a security mode specified within the security parameter further comprises:

setting an inactivity timer to a period defined within the security parameter.

10. The method of claim 5, further comprising:

maintaining the security mode for a duration of the calendar event; and changing to another security mode after the calendar event completes.

11. A system for calendar-induced security of a user-accessible processing system, comprising:

a user calendar containing a calendar entry; and a security parameter associated with the calendar entry, wherein the associated security parameter specifies a security mode to be initiated upon reaching a start time for the calendar entry.

12. The system of claim 11, wherein the associated security parameter is user-specified.

13. The system of claim 11, wherein the associated security parameter is assigned to an event type for the calendar entry.

14. The system of claim 11, further comprising:

a security module receiving a notification of the calendar event from the user calendar and initiating the security mode at a start of the calendar event.

15. A system for calendar-induced security of a data processing system, comprising:

a user calendar determining whether a start time for a calendar entry within a user calendar has been reached, and responsive to determining that the start time has been reached, determining whether a security parameter is associated with the calendar entry, and responsive to identifying a security parameter associated with the calendar entry, sending a notification of the start time from the calendar and the security parameter; and a security module receiving the notification from the user calendar and initiating a security mode specified within the security parameter.

16. The system of claim 15, wherein the security mode requires the security module to lock a system containing the user calendar so that access to the applications hosted on the system is restricted until the lock is later removed, wherein said lock is later removed by occurrence of a condition from among (1) completion of the calendar event; and (2) entry by a user of an override password.

17. The system of claim 16, wherein the security module locks the system until a user requests a different security mode.

18. The system of claim 16, wherein the security module locks the system for a duration of the calendar event.

19. The system of claim 15, wherein the security mode requires the security module to set an inactivity timer to a period defined within the security parameter.

20. The system of claim 15, wherein the security module maintains the security mode for a duration of the calendar event.

21. A computer program product within a computer usable medium for calendar-induced security, comprising:
   instructions for creating a calendar entry within a user calendar on a data processing system; and
   instructions for associating a security parameter with the calendar entry, wherein the associated security parameter specifies a security mode associated with operation of the data processing system to be initiated upon reaching a start time for the calendar entry.

22. The computer program product of claim 21, wherein the instructions for associating a security parameter with the calendar entry further comprise:
   instructions for prompting the user to specify the security mode, wherein said user selects the security mode from among a list of available security modes comprising restricted access and no access.

23. The computer program product of claim 21, wherein the instructions for associating a security parameter with the calendar entry further comprise:
   instructions for selecting a security mode previously assigned to an event type for the calendar entry.

24. The computer program product of claim 21, further comprising:
   instructions for automatically initiating the security mode at a start of the calendar event; and
   instructions for removing the security mode at an end of the calendar event.

25. A computer program product of calendar-induced security, comprising:
   instructions for determining whether a start time for a calendar entry within a user calendar has been reached;
   instructions, responsive to determining that the start time has been reached, for determining whether a security parameter is associated with the calendar entry; and
   instructions, responsive to identifying a security parameter associated with the calendar entry, for initiating a security mode specified within the security parameter.

26. The computer program product of claim 25, wherein the instructions for initiating a security mode specified within the security parameter further comprise:
   instructions for restricting user access to a system containing the user calendar to only an authorized user having an access password so that access to the applications hosted on the system is restricted until the lock is later removed, wherein said lock is later removed by occurrence of a condition from among (1) completion of the calendar event; and (2) entry by a user of an access password.

27. The computer program product of claim 26, wherein the instructions for locking a system containing the user calendar further comprise:
   instructions for locking the system until a user request a different security mode.

28. The computer program product of claim 26, wherein the instructions for locking a system containing the user calendar further comprise:
   instructions for locking the system for a duration of the calendar event.

29. The computer program product of claim 25, wherein the instructions for initiating a security mode specified within the security parameter further comprise:
   instructions for setting an inactivity timer to a period defined within the security parameter.

30. The computer program product of claim 25, further comprising:
   instructions for maintaining the security mode for a duration of the calendar event.

* * * * *